May 24, 1966 G. CHIEGER ETAL 3,252,730
SIDE RACK CONVERTIBLE TRAILER CONSTRUCTION
Filed April 1, 1964 6 Sheets-Sheet 1
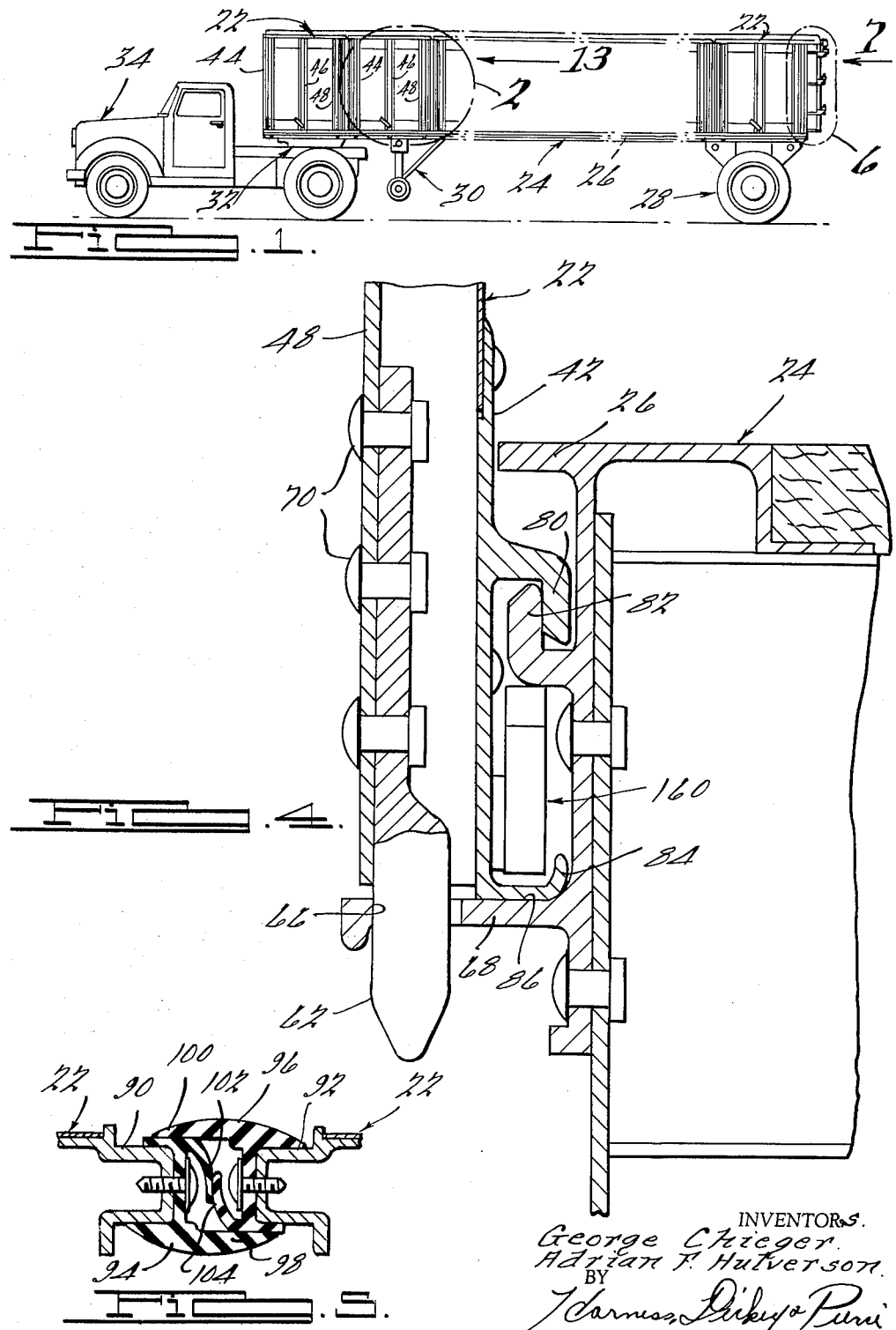
INVENTORS.
George Chieger
Adrian F. Hulverson
BY
Harness, Dickey & Pierce
ATTORNEYS May 24, 1966  G. CHIEGER ETAL  3,252,730
SIDE RACK CONVERTIBLE TRAILER CONSTRUCTION
Filed April 1, 1964  6 Sheets-Sheet 2
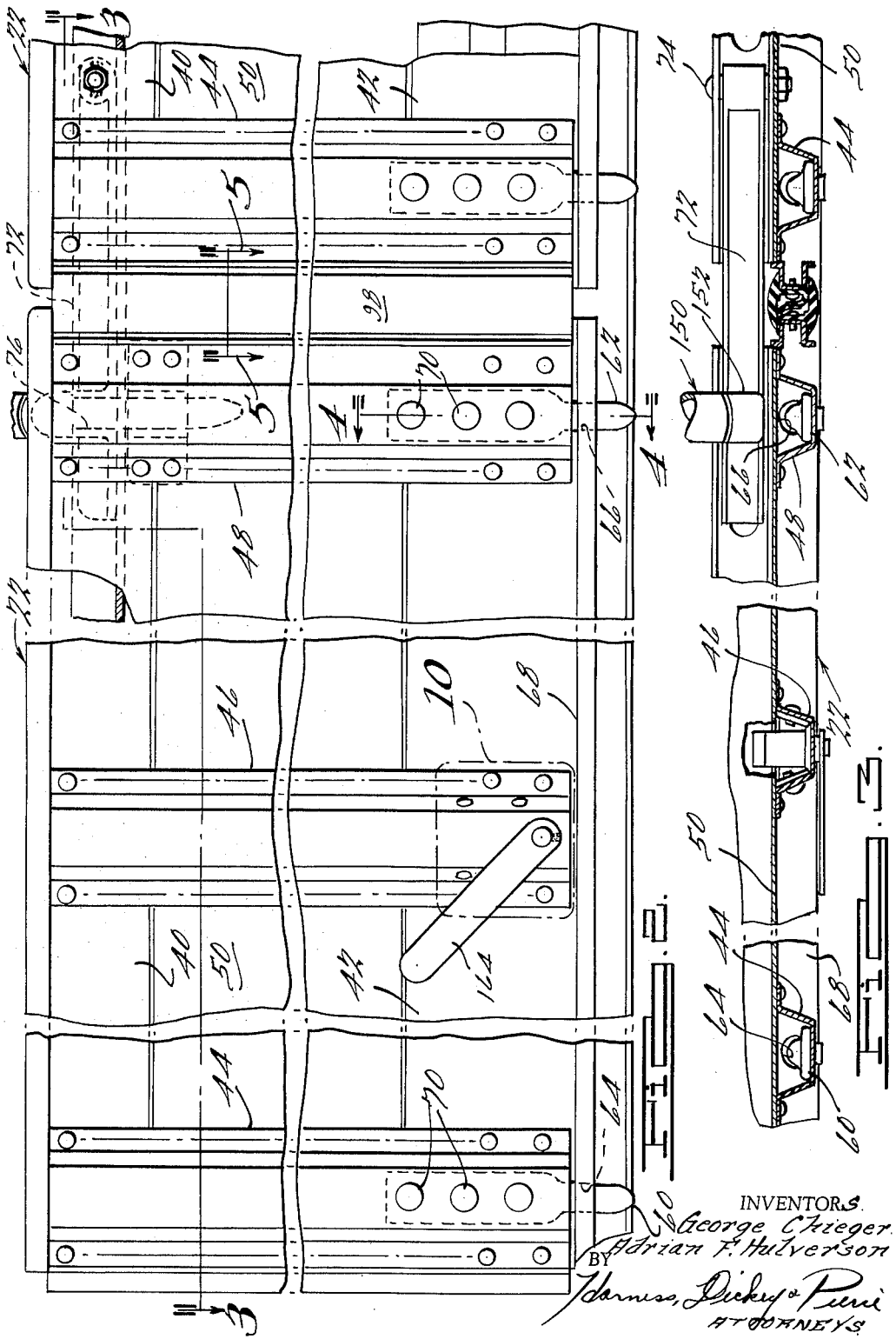
INVENTORS.
George Chieger
Adrian F. Hulverson
BY
Harness, Dickey & Pierce
ATTORNEYS May 24, 1966 G. CHIEGER ETAL 3,252,730
SIDE RACK CONVERTIBLE TRAILER CONSTRUCTION
Filed April 1, 1964 6 Sheets-Sheet 3
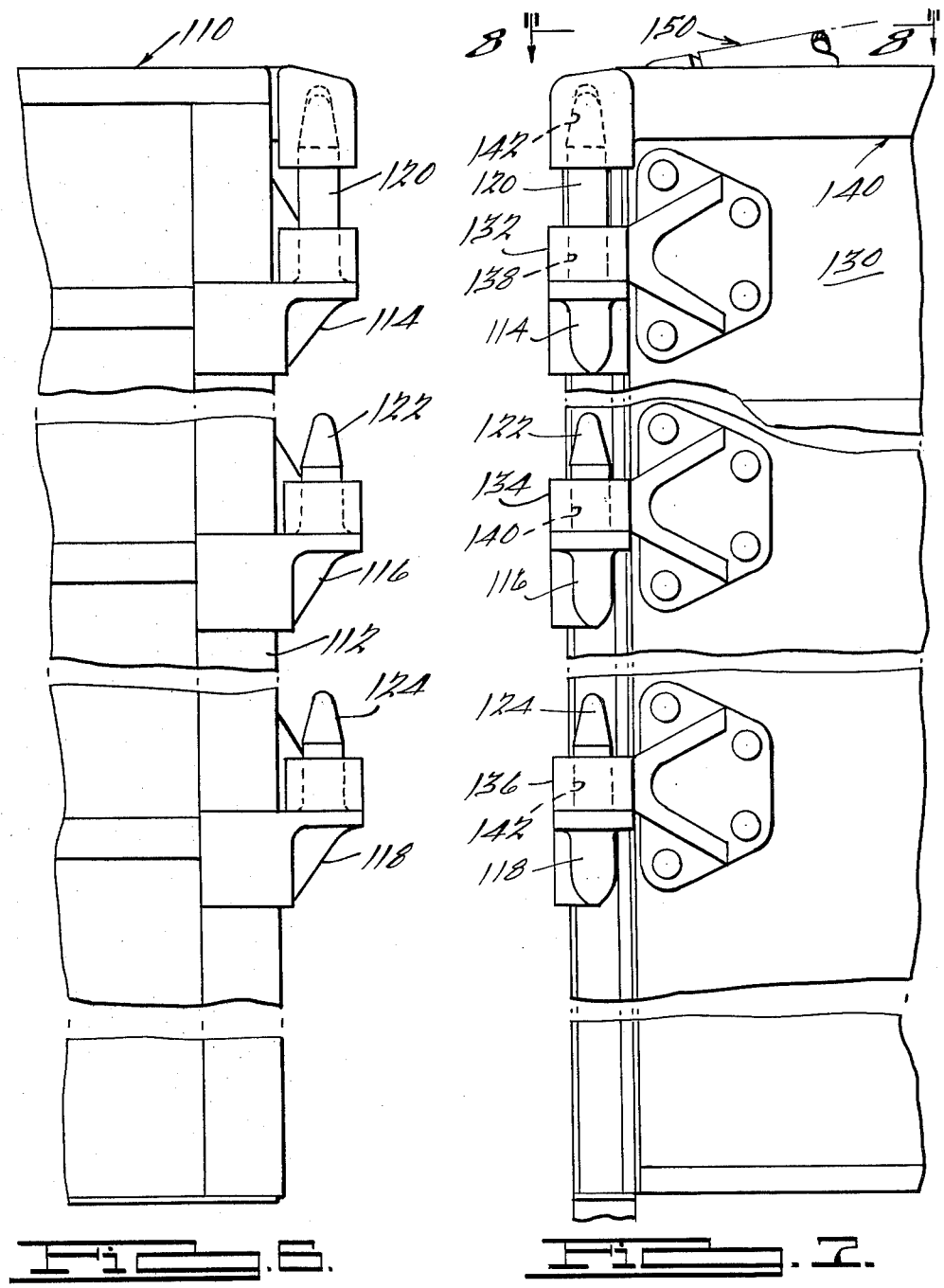
INVENTORS.
George Chieger.
Adrian F. Hulverson.
BY
Harness, Dickey & Pierce.
ATTORNEYS.

May 24, 1966  G. CHIEGER ETAL  3,252,730
SIDE RACK CONVERTIBLE TRAILER CONSTRUCTION
Filed April 1, 1964  6 Sheets-Sheet 4
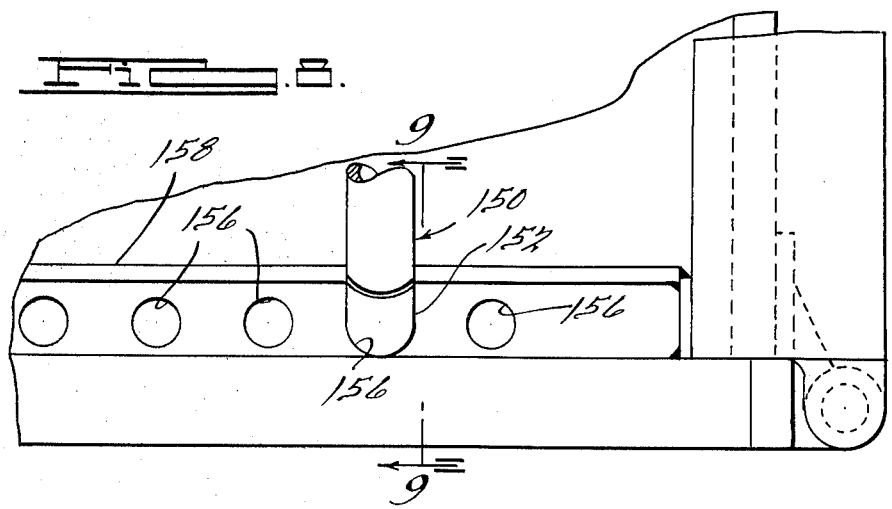
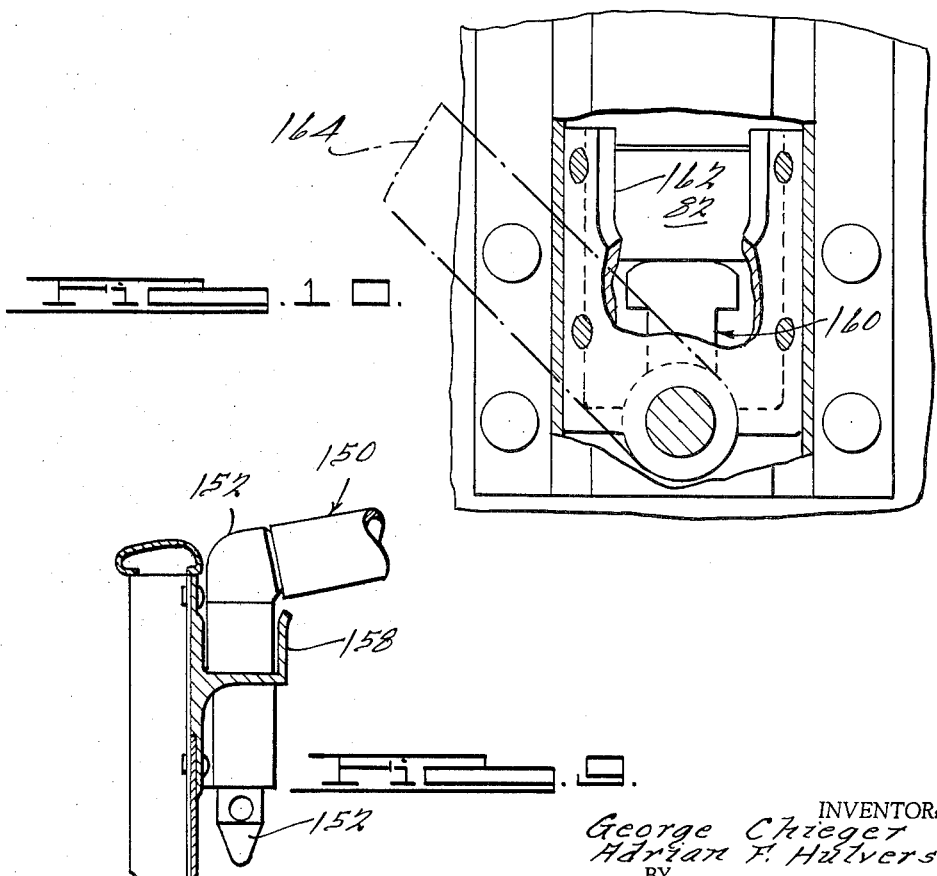
INVENTORS.
George Chieger
Adrian F. Hulverson
BY
ATTORNEYS.

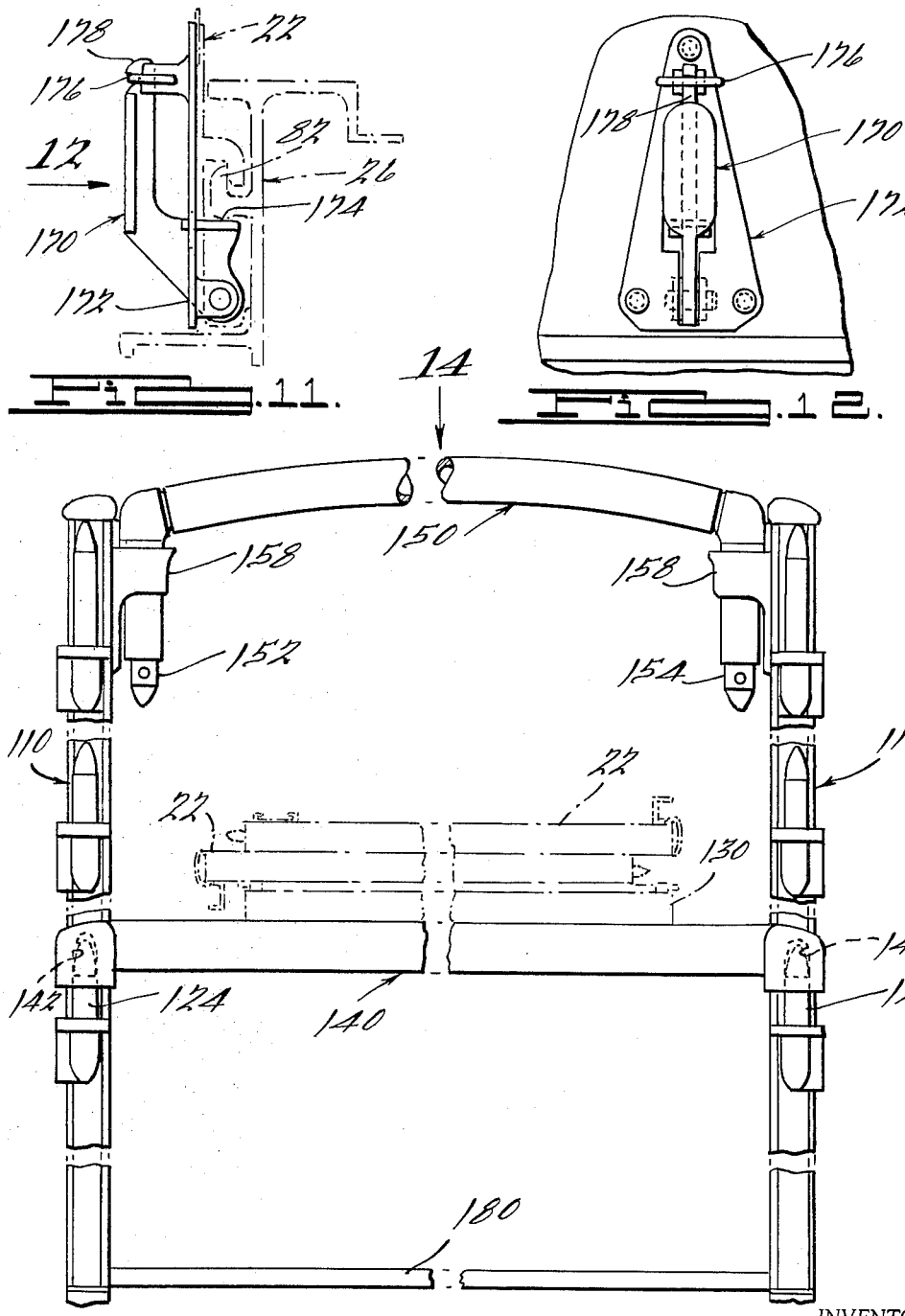

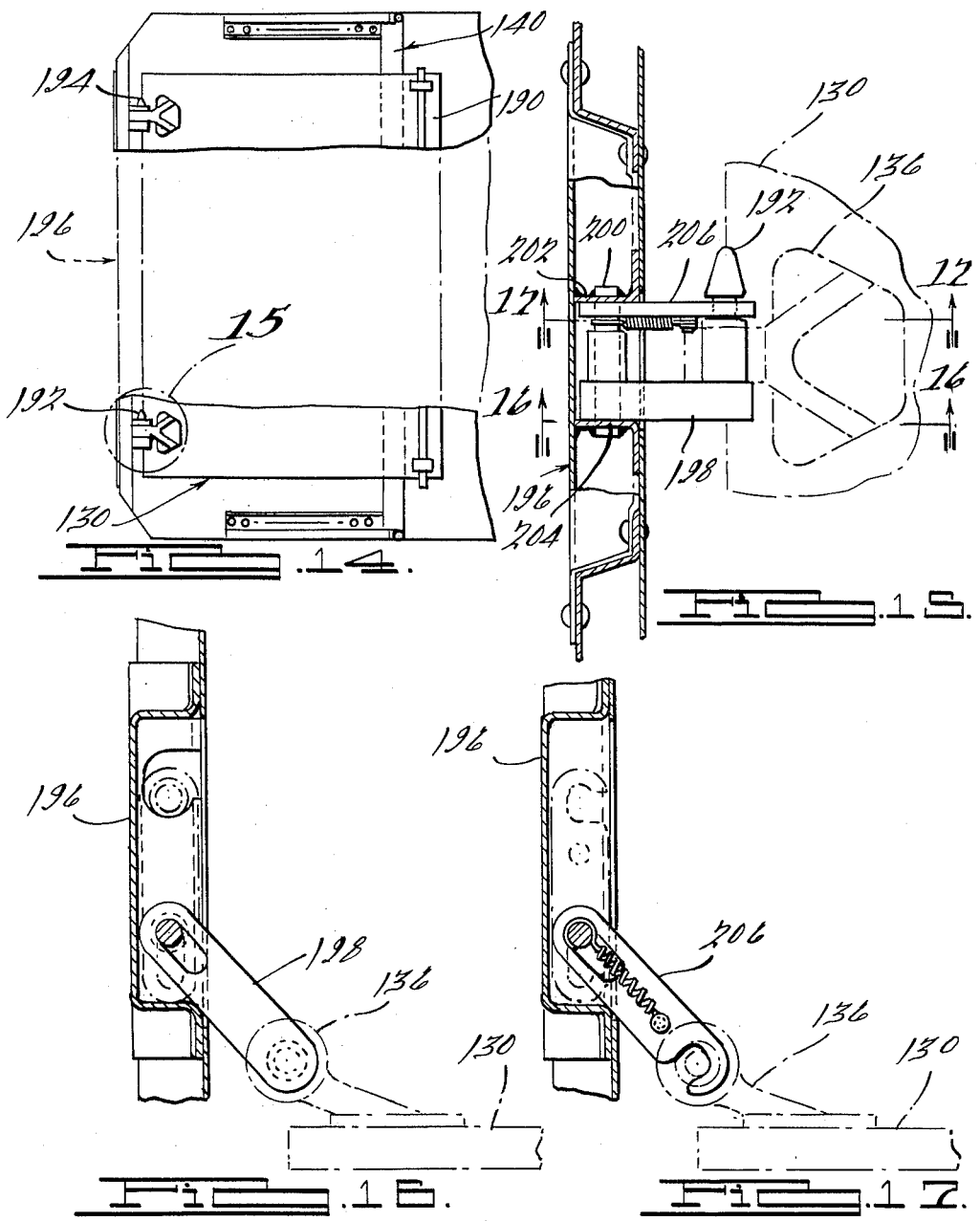

United States Patent Office
3,252,730
Patented May 24, 1966

3,252,730
SIDE RACK CONVERTIBLE TRAILER
CONSTRUCTION
George Chieger, Birmingham, and Adrian F. Hulverson, Grosse Pointe Woods, Mich., assignors to Fruehauf Corporation, Detroit, Mich., a corporation of Michigan
Filed Apr. 1, 1964, Ser. No. 356,548
5 Claims. (Cl. 296—28)

This application relates generally to heavy duty flat bed truck and trailer constructions and more particularly to an improved removable side rack for flat bed trucks, trailers and the like.

It is desirable for heavy duty over-the-road vehicles to be convertible to meet various loading conditions. For example, it is desirable for such vehicles to be conditionable for carrying relatively small comminuted materials as well as to be conditionable to carry relatively long or wide objects, for example, steel beams. One way to solve this problem is to provide a flat bed trailer with removable side racks. However, side racks heretofore known and used, have been rudimentary in construction and unsatisfactory in function thereby limiting the versatility of the vehicle.

A trailer construction in accordance with the instant invention maximizes the utility of a flat bed trailer in either the flat bed or van condition. Novel side racks exhibit a heretofore unknown degree of structural integrity when secured to the side rails of the vehicle yet are relatively easily removed from the upstanding condition and stored at the front of the vehicle. Storage of the side racks is facilitated by a modular construction that facilitates stacking and locking of the side racks in the storage condition. Components used to retain the racks in the vertical condition on the side rails of the trailer are also used to facilitate stacking.

When the side racks are secured to the side rails of the trailer, a novel locking mechanism is utilized to preclude disassociation of the side racks with the side rails as well as to interlock the side rails with one another to form a structurally integrated assembly.

Accordingly, one object of the instant invention is an improved trailer construction.

Another object is an improved side rack for a flat bed trailer.

Another object is a side rack for a flat bed trailer that is secured thereto in an improved manner.

Another object is an improved means for storing the side racks for a flat bed trailer on the trailer itself in a manner that maximizes the usable area of the trailer.

Other objects and advantages of the present invention will be apparent in following specification, claims and drawings, wherein:

FIGURE 1 is a side elevational view of a flat bed trailer having the improved side racks of the instant invention secured thereto in operative association;

FIG. 2 is an enlarged fragmentary view taken substantially within the circle 2 of FIGURE 1;

FIG. 3 is a cross sectional view taken substantially along the line 3—3 of FIGURE 2;

FIG. 4 is a cross sectional view taken substantially along the line 4—4 of FIGURE 2;

FIG. 5 is a cross sectional view taken substantially along the line 5—5 of FIGURE 2;

FIG. 6 is an enlarged fragmentary view of the subject matter within the circle 6 of FIGURE 1;

FIG. 7 is a view taken in the direction of the arrow 7 of FIGURE 1 with the rear panel secured thereto;

FIG. 8 is a view taken substantially along the line 8—8 of FIGURE 7.

FIG. 9 is a cross sectional view taken substantially along the line 9—9 of FIGURE 8;

FIG. 10 is a view of the subject matter within the area 10 of FIGURE 2;

FIG. 11 is a view, similar to FIG. 4, of a modified lock for the side rack;

FIG. 12 is a view taken in the direction of the arrow 12 in FIGURE 11;

FIG. 13 is a view taken in the direction of the arrow 13 in FIG. 1 with the side racks in a storage condition;

FIG. 14 is a view taken in the direction of the arrow 14 in FIGURE 13;

FIG. 15 is a fragmentary enlarged view of the subject matter within the circle 15 of FIGURE 14;

FIG. 16 is a cross sectional view taken substantially along the line 16—16 of FIGURE 15, and FIG. 17 is a cross sectional view taken substantially along the line 17—17 of FIGURE 15.

As seen in FIGURE 1 of the drawings, a side rack construction, in accordance with an exemplary constructed embodiment of the instant invention, comprises, a plurality of modular side rack panels 22 that are interlocked with one another and to a flat bed trailer 24 in a manner to be described hereinafter. The flat bed trailer 24 is conventional in construction except for an improved configuration for the side rails 26 thereof which extend longitudinally of the trailer 24 on both sides thereof. The trailer 24 is provided with a conventional rear wheel suspension 28, landing gear 30, and kingpin (not shown) to facilitate coupling of the trailer 24 to a conventional fifth wheel 32 of a tractor 34.

As best seen in FIGURES 2 and 3 of the drawings, each of the side racks 22 comprises an upper rail 40 and lower rail 42 that are interconnected by a plurality of upstanding posts 44, 46 and 48, respectively. The vertical posts 44, 46 and 48 are secured to the upper and lower rails 40 and 42, respectively, and to an inner skin 50 as by riveting.

In accordance with one feature of the instant invention, the posts 44 and 48 are provided with downwardly extending positioning pins 60 and 62, respectively, that are accepted in complementary apertures 64 and 66 in a horizontally extending flange 68 of the side rail 26 of the trailer 24. The spacing of the apertures 64 and 66 is such that any one of the side rack panels 22 will be accepted. As best seen in FIG. 4, the posts 60 and 62 are secured to the bight portion of the posts 44 and 48 as by suitable rivets 70.

The upper corners of adjacent panels 22 are locked against lateral deflection by a tie arm 72 which is journaled for rotation by a pin 74. The arm 72 has an aperture 76 therein for the acceptance of a pin on a cross bar, to be described.

As best seen in FIGURE 4 of the drawings, the lower rail 42 of the side rack panel 22 is provided with a downwardly extending gooseneck portion 80 that is engageable with a complementary upwardly extending gooseneck 82 on the side rail 26 of the trailer 24 to maintain the panel 22 in an upright condition. The gooseneck portion 80 functions in conjunction with the pin 62 which is engaged in the aperture 66 in the horizontal lower flange 68 of the side rail 26. The panel 22 is positioned vertically relative to the side rail 26 by a lower flange 84 that is seated on an upper surface 86 of the lower horizontal flange 68 of the rail 26.

As best seen in FIGURE 5 of the drawings, opposed vertical edge portions 90 and 92 of adjacent panels 22 are provided with identical seals 94 and 96, respectively. The seals 94 and 96 are arranged in reverse orientation so that a pair of longitudinally extending outer lips 98 and 100 thereon, respectively, overlap the adjacent opposed seal. Furthermore, the seals 94 and 96 are provided with inner lips 102 and 104, respectively, that engage one another to provide additional sealing between the adjacent panels 22.

As best seen in FIGURE 6 of the drawings, a rearmost panel 110 is similar in construction to the panels 22 except that a rear vertical edge portion 112 thereof is provided with three pin brackets 114, 116, and 118 having vertically extending hinge and positioning pins 120, 122, and 124 thereon, respectively.

As best seen in FIGURE 7 of the drawings, a rear door 130 has a plurality of brackets 132, 134 and 136 having apertures 138, 140 and 142 therein for the acceptance of the pins 120, 122 and 124, respectively. In this manner the rear door 130 is positioned and pivotally supported by the rearmost side rack 110. The rear door 130 extends transversely only one half the width of the trailer, a complementary door, not shown, being hinged on the rearmost side rack on the opposite side.

The rearmost side racks 22 are rigidified against lateral buckling due to opening of the door 130 and due to heavy loads of comminuted materials by a rear end header 140 having suitable recesses 142 and 144 therein for the acceptance of the pins 120 on the rearmost side racks 110. The header 140 serves another function, as will be described hereinafter.

As best seen in FIGURES 8 and 13 of the drawings, a plurality of lateral bows 150 are provided with downwardly extending pins 152 and 154 at opposite ends thereof for acceptance in complementary apertures 156 in complementary cross bow support brackets 158 on the side panels 22.

As best seen in FIGURE 10 of the drawings, the side panels 22 are locked against vertical movement relative to the lower side rail 68 of the trailer 24 by a rotatable dog 160 that is journaled for rotation about a horizontal transverse axis by a bracket 162 which in turn is secured to the vertical post 46 as by riveting. The dog 160 has a manual operator 164 thereon to facilitate rotation into a vertically extending locking condition against the gooseneck portion 82 of the rail 68, best seen in FIGURES 4 and 10 of the drawings, from a horizontal unlocked condition which permits the panel 22 to be elevated relative to the side rail 26.

As best seen in FIGURE 11 of the drawings, a modified lock for the panel 22 comprises a locking lever 170 that is journaled for rotation about a horizontal longitudinal axis by a suitable bracket 172 on the panel 22. The locking lever 170 has a rail engaging seat 174 thereon which moves into close underlying relationship to the flange 82 on the rail 26 thereby to preclude vertical movement of the panel 22 relative to the rail 26. The lever 170 is locked in an upright condition as by a ring 176 which drops over an upper end portion 178 of the lever 170.

As best seen in FIGURE 13 of the drawings, the rearmost side racks 110 and header 140 have been removed from the rear of the trailer and installed at the front of the trailer. The header 140 is engaged on the lowermost pins 124 of the side racks 22 to form a transversely extending support for the side panels 22. It is to be noted that the header 140 is spaced from the floor surface 180 of the trailer 24 when in the panel storage condition. Furthermore, it is to be noted that a roof bow 150 is engaged in the complementary brackets 158 on the panels 110 to rigidify the upper edge portions thereof in the storage condition.

As best seen in FIGURE 14 of the drawings, the transverse door panel 130 is supported by the header 140 at a rear end 190 thereof and by a pair of pins 192 and 194 which are secured to a front bulkhead 196 of the trailer 24. The rear door panel 130 forms a platform upon which the side panels 22 are stacked to effect storage thereof.

As best seen in FIGURES 15 through 17 of the drawings, the pin 192, as well as the pin 194, is supported for rotation by an arm 198 which in turn is journaled for rotation about a horizontal transverse axis by a shaft 200 which is supported by suitable brackets 202 and 204 in the front bulkhead 196. A suitable locking lever 206 is engageable over the pin 192 to preclude disassociation of the bracket 136 on the door 130 therefrom. It is to be noted that the pin 192, its mounting bracket 198 and the locking lever 206 are movable to a storage condition within the front bulkhead 196 as by rotating the pin 192, its support 198, and lever 206 to a vertical condition about the shaft 200 thence dropping the pin 192, its support 198, and the locking lever 206 vertically relative to the front bulkhead 196.

From the foregoing description it should be apparent that the removable side rack of the instant invention is thoroughly engineered to solve the problems incident to use of a trailer in both the "flatbed" condition and in a condition for carrying comminuted materials. The side racks are positioned and supported on the side rails of the flatbed trailer in a unique manner. The racks are locked to both the side rails and to one another in a manner that precludes undue lateral flexure thereof. The side racks are repositionable on the flatbed of the trailer to form a storage shelf for the remaining side racks which shelf is elevated relative to the bed of the trailer to permit carrying of relatively long articles, for example, steel beams.

It is to be understood that the specific construction of the improved trailer construction herein disclosed and described is presented for the purpose of explanation and illustration and is not intended to indicate limits of the invention, the scope of which is defined by the following claims.

What is claimed is:

1. A convertible vehicle comprising
an elongated flat bed,
a pair of side panels, removably secured to opposite sides of said flat bed at the rear end thereof,
first hinge means on said side panels for pivotally supporting a rear panel,
a front panel extending laterally of said flat bed,
a rear panel extending laterally of said flat bed having second hinge means complementary to said first hinge means and engageable therewith to effect hinging of said rear panel, and
means on said front panel for removably engaging said second hinge means on said rear panel for securing a front edge of said rear panel to said front panel in horizontally extending vertically spaced relation to said flat bed, and a cross header engageable with a forwardmost pair of side panels in horizontal alignment with said engaging means on said front panel for supporting a rear edge of said rear panel, whereby said rear panel is capable of supporting a number of said side panels in vertically spaced relation to said flat bed so as to expose the entire surface of said flat bed.

2. A convertible vehicle comprising
an elongated flat bed,
a pair of side panels, removably securable to opposite sides of said flat bed at the rear end and at the front end thereof, selectively,
hinge means on said side panels for pivotally supporting a rear panel,
a front panel extending laterally of said flat bed,
a rear panel extending laterally of said flat bed having means complementary to said hinge means and engageable therewith to effect hinging of said rear panel,
means on said front panel for removably engaging said complementary means on said rear panel for securing said rear panel to said front panel in a storage condition in vertically spaced relation to said flat bed, and,
a transversely extending header engageable with the hinge means on said side panels for supporting the rear end of said rear panel when it is in the storage condition.

3. A convertible vehicle comprising
an elongated rectangular flat bed,
a side rail on said flat bed having a horizontally outwardly extending lower flange with longitudinally spaced apertures therein,
said side rail having a generally L-shaped flange spaced upwardly from said lower flange defined by a horizontally outwardly extending portion and an upwardly extending edge portion, and
a side panel having spaced downwardly extending pins engageable in the apertures in said side rail, respectively, said side panel having a lower edge seatable on the lower flange of said side rail and a flange spaced upwardly from the lower edge thereof with a downwardly extending edge portion engageable behind the upwardly extending portion of said side rail to secure said side panel on said side rail.

4. A convertible vehicle comprising
an elongated rectangular flat bed,
a side rail on said flat bed having a horizontally outwardly extending lower flange with longitudinally spaced apertures therein,
said side rail having a generally L-shaped flange spaced upwardly from said lower flange defined by a horizontally outwardly extending portion and an upwardly extending edge portion,
a side panel having spaced downwardly extending pins engageable in the apertures in said side rail, respectively, said side panel having a lower edge seatable on the lover flange of said side rail and a flange spaced upwardly from the lower edge thereof with a downwardly extending edge portion engageable behind the upwardly extending portion of said side rail to secure said side panel on said side rail, and
locking means on said side panel engageable under said L-shaped flange on said side rail for precluding vertical movement of said side panel relative to said side rail.

5. A convertible vehicle comprising
an elongated rectangular flat bed,
side rails on opposite sides of said flat bed having horizontally outwardly extending lower flanges with longitudinally spaced apertures therein,
said side rails having generally L-shaped flanges spaced upwardly from said lower flanges defined by horizontally outwardly extending portions and upwardly extending edge portions, respectively,
a plurality of side panels having spaced downwardly extending pins engageable in the apertures in said side rails, respectively, said side panels having lower edges seatable on the lower flanges on said side rails and flanges spaced upwardly from the lower edges thereof with downwardly extending edge portions engageable behind the upwardly extending portions of said side rails to secure said side panels on said side rails,
locking means on each of said side panels engageable under said L-shaped flanges on said side rails for precluding vertical movement of said side panels relative to said side rails,
a tie arm pivotally secured to each of said side panels and engaging an adjacent side panel at the upper end thereof, and
a plurality of cross bows having end portions engageable with said adjacent panels for locking said tie arms thereto, respectively.

References Cited by the Examiner
UNITED STATES PATENTS

| | | | |
|---|---|---|---|
| 3,010,755 | 11/1961 | Black | 296—28 |
| 3,097,012 | 7/1963 | Bain | 296—10 |
| 3,097,880 | 7/1963 | Reader | 296—36 |
| 3,126,224 | 3/1964 | Carter et al. | 296—28 |
| 3,155,419 | 11/1964 | Garson et al. | 296—28 |
| 3,163,462 | 12/1964 | Valesky | 296—28 |

BENJAMIN HERSH, *Primary Examiner.*

E. E. PORTER, *Assistant Examiner.*